United States Patent
Onitsuka et al.

(10) Patent No.: US 10,688,603 B2
(45) Date of Patent: Jun. 23, 2020

(54) FLUX FOR RESIN FLUX CORED SOLDER, FLUX FOR FLUX COATED SOLDER, RESIN FLUX CORED SOLDER, AND FLUX COATED SOLDER

(71) Applicant: SENJU METAL INDUSTRY CO., LTD., Tokyo (JP)

(72) Inventors: Motohiro Onitsuka, Tokyo (JP); Yoko Kurasawa, Tokyo (JP); Toshihisa Kugi, Tokyo (JP); Hiroyoshi Kawasaki, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/304,099

(22) PCT Filed: Dec. 27, 2017

(86) PCT No.: PCT/JP2017/046832
§ 371 (c)(1),
(2) Date: Nov. 21, 2018

(87) PCT Pub. No.: WO2018/225288
PCT Pub. Date: Dec. 13, 2018

(65) Prior Publication Data
US 2019/0358753 A1    Nov. 28, 2019

(30) Foreign Application Priority Data
Jun. 7, 2017    (JP) .................................. 2017-112459

(51) Int. Cl.
B23K 35/36    (2006.01)
B23K 35/362   (2006.01)
(Continued)

(52) U.S. Cl.
CPC ........ B23K 35/362 (2013.01); B23K 35/0227 (2013.01); B23K 35/0266 (2013.01);
(Continued)

(58) Field of Classification Search
CPC .................................................... B23K 35/362
(Continued)

(56) References Cited

U.S. PATENT DOCUMENTS

| 5,907,007 | A  | 5/1999 | Ito et al. |
| 2008/0053572 | A1 | 3/2008 | Sanji et al. |
| 2015/0102090 | A1 | 4/2015 | Arai et al. |

FOREIGN PATENT DOCUMENTS

| EP | 2939784 A1 | 11/2015 |
| JP | H09-253884 A | 9/1997 |

(Continued)

OTHER PUBLICATIONS

International Search Report and Written Opinion (in Japanese) issued in PCT/JP2017/046832, dated Apr. 3, 2018; ISA/JP.
(Continued)

*Primary Examiner* — Scott R Kastler
(74) *Attorney, Agent, or Firm* — Harness, Dickey & Pierce, P.L.C.

(57) ABSTRACT

A flux for a resin flux cored solder or a flux coated solder, in which scattering of flux and solder in using the solder is suppressed, and a resin flux cored solder or a flux coated solder including such a flux are provided. The flux for a resin flux cored solder can include a rosin resin, an activator, and at least one selected from an acrylic polymer and a vinyl ether polymer, which has a weight average molecular weight of 8000 to 100000, in an amount of 0.1 to 3 mass-% based on the total mass of the flux.

5 Claims, 1 Drawing Sheet

(51) Int. Cl.
*B23K 35/02* (2006.01)
*B23K 35/26* (2006.01)
*B23K 35/365* (2006.01)
*B23K 35/368* (2006.01)
*B23K 35/40* (2006.01)

(52) U.S. Cl.
CPC .......... *B23K 35/262* (2013.01); *B23K 35/365* (2013.01); *B23K 35/368* (2013.01); *B23K 35/3613* (2013.01); *B23K 35/404* (2013.01); *B23K 35/406* (2013.01)

(58) Field of Classification Search
USPC .......................................................... 148/23
See application file for complete search history.

(56) References Cited

FOREIGN PATENT DOCUMENTS

| | | |
|---|---|---|
| JP | 2008-030103 A | 2/2008 |
| JP | 2008-100262 A | 5/2008 |
| JP | 2012-016737 A | 1/2012 |
| JP | 2013-188761 A | 9/2013 |
| JP | 2013193097 A | 9/2013 |
| JP | 2015-039718 A | 3/2015 |
| JP | 2015-131336 A | 7/2015 |
| JP | 2017064759 A * | 4/2017 |

OTHER PUBLICATIONS

Office Action issued in JP-2017-112459 (granted as JP-6268507-B1), dated Aug. 4, 2017 (with English translation).
Decision to Grant issued in JP-2017-112459 (granted as JP-6268507-B1), dated Nov. 24, 2017(with English translation).
Extended European Search Report dated Jul. 4, 2019 in corresponding European Patent Application No. 17909653.2.
International Search Report issued in corresponding International Patent Application No. PCT/JP2017/046832, dated Apr. 3, 2018, with English translation.

* cited by examiner

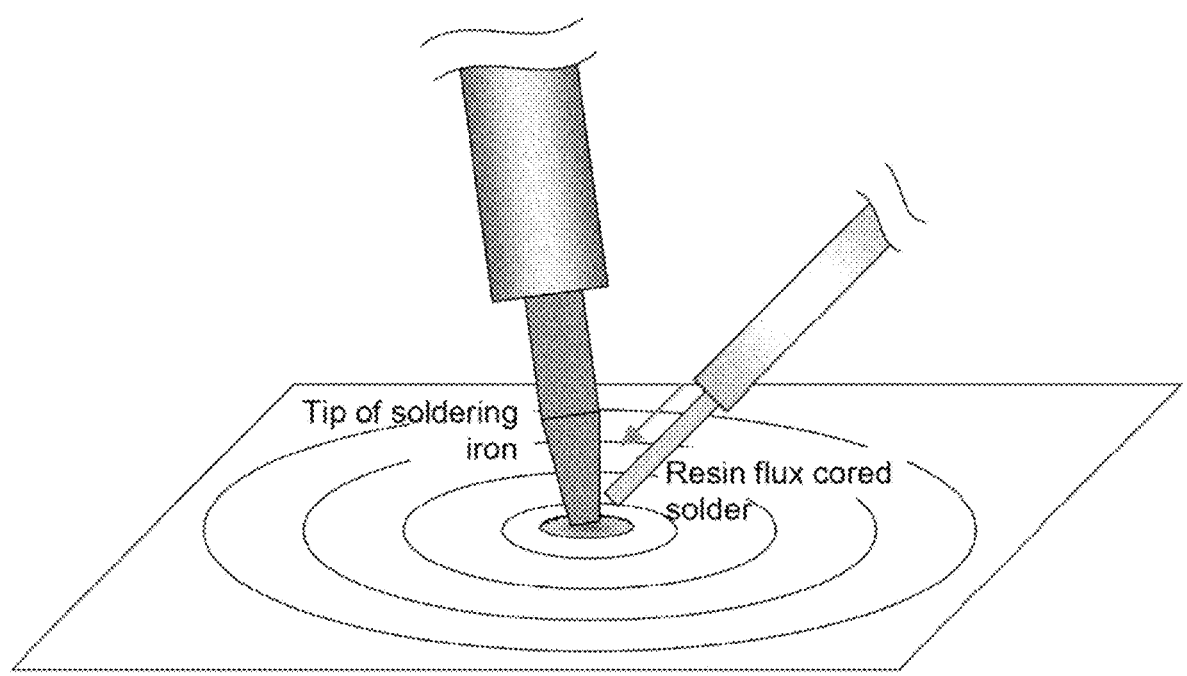

FLUX FOR RESIN FLUX CORED SOLDER, FLUX FOR FLUX COATED SOLDER, RESIN FLUX CORED SOLDER, AND FLUX COATED SOLDER

CROSS-REFERENCE TO RELATED APPLICATIONS

This application is the U.S. National Phase Application under 35 U.S.C. 371 of International Application No. PCT/JP2017/046832, filed on Dec. 27, 2017, which claims the benefit of priority from Japanese Patent Application 2017-112459 filed on Jun. 7, 2017. The entire disclosures of these applications are incorporated herein by reference in their entirety.

TECHNICAL FIELD

The present invention relates to a flux for a resin flux cored solder, a flux for a flux coated solder, a resin flux cored solder, and a flux coated solder.

BACKGROUND ART

The resin flux cored solder is a material made of a solder alloy having a hollow filled with a solid or high viscosity liquid flux. The flux coated solder is a material of a solder alloy whose outer surface is coated with a flux. The flux in resin flux cored solder or flux coated solder removes chemically a metal oxide present on the solder and the metal surface to be soldered at the time of soldering to enable a metal element to move in the boundary between the both. By using the flux, an intermetallic compound is formed between the solder and the metal surface to be soldered, so that strong joint may be obtained.

When parts are joined together using a resin flux cored solder or a flux coated solder, a scattering of flux, and a scattering of solder entrained therewith may occur. Since the scattering of flux and solder may lead to short circuit between electrodes of the joined parts, and contamination of the substrate, it is required to prevent the scattering of flux and solder.

For a resin flux cored solder or a flux coated solder, which comprises a flux, the flux is required to be in a solid or high viscosity liquid state at room temperature (25° C.) from the viewpoint of a processability. When a flux is in a low viscosity liquid state, it becomes difficult to process (process to an arbitrary size and shape) a resin flux cored solder or a flux coated solder.

As a conventional flux for a resin flux cored solder, for example, a flux comprising an inhibitor of concentrated gas release, by generating a large number of fine microbubbles in a flux molten by heating at the time of soldering so as to permit a plurality of minute gas escapes has been proposed (PTL 1). In the flux described in PTL 1, an acid-modified rosin, or an organic acid, which is a kind of activator, is used as an inhibitor of concentrated gas release, by which a minute gas component is discharged quickly so that generation of a large volume gas component leading to the scattering of flux may be prevented. However, in the flux described in PTL 1, a rosin resin and an activator, which are main components of the flux, are limited to specific components, and therefore there appear restrictions on optimization of the components of flux, such as a rosin resin and an activator, according to the type of a solder alloy or joining conditions.

In addition, for preventing the scattering of flux, for example, a solder composition comprising a flux comprising a rosin resin, an activator, a solvent, and an antifoaming agent having a solubility parameter (SP value) of 9.5 or less, and a weight average molecular weight of 100000 or more, and a solder powder has been proposed (PTL 2). However, PTL 2 is designed to prevent the scattering of flux in a solder composition (solder paste) composed of a mixture of a flux and a solder powder by using an antifoaming agent having a specific weight average molecular weight. But, PTL 2 is not designed to prevent the scattering of flux in a resin flux cored solder or a flux coated solder, in which a flux and a solder are not mixed and exist separately. Further, since the flux in PTL 2 comprises a solvent, and is in a low viscosity liquid state, it is difficult to process a resin flux cored solder or a flux coated solder comprising such a flux.

Further, it has been proposed that a leveling agent, an antifoaming agent, and a solvent are also blended into a flux composition for soldering comprising a resin obtained by a ring-opening half esterification reaction of a cyclic acid anhydride having a 6-membered carbon ring structure with a polyhydric alcohol, and a specific silicon compound (PTL 3). However, PTL 3 is a technique relevant to a solder paste in which a flux and a solder powder are mixed. But, PTL 3 is not relevant to a resin flux cored solder or a flux coated solder, in which a flux and a solder are not mixed and exist separately. Further, PTL 3 does not disclose a technique of prevention of scattering of flux by using a leveling agent and an antifoaming agent. Meanwhile, a flux in PTL 3 comprises a solvent, and is in a state of low viscosity liquid, and therefore it is difficult to process a resin flux cored solder, or a flux coated solder comprising such a flux.

As described above, a resin flux cored solder or a flux coated solder, for which a scattering of flux and solder at the time of using the solder is suppressed, and which is superior in a processability, and a flux to be contained therein have been demanded.

CITATION LIST

Patent Literature

PTL 1: Japanese Patent Laid-Open No. 2012-16737
PTL 2: Japanese Patent Laid-Open No. 2015-131336
PTL 3: Japanese Patent Laid-Open No. 2008-100262

SUMMARY OF INVENTION

Technical Problem

An object of the present invention is to provide a resin flux cored solder, or a flux coated solder, for which the scattering of flux and solder in using the solder is suppressed, and a flux to be contained therein.

Another object of the present invention is to provide a resin flux cored solder, or a flux coated solder, which is superior in the processability in addition to the suppression of the scattering of flux and solder at the time of using a solder, and a flux to be contained therein.

Solution to Problem

As a result of intensive studies for achieving the objects, the present inventors have found that the objects may be achieved by using a flux comprising a specific polymer, thereby completing the present invention. Specific aspects of the present invention are as follows.

[1]
A flux for a resin flux cored solder comprising:
a rosin resin,
an activator, and
at least one selected from an acrylic polymer and a vinyl ether polymer, which has a weight average molecular weight of 8000 to 100000, in an amount of 0.1 to 3 mass-% based on the total mass of the flux.

[2]
A flux for a flux coated solder comprising:
a rosin resin,
an activator, and
at least one selected from an acrylic polymer and a vinyl ether polymer, which has a weight average molecular weight of 8000 to 100000, in an amount of 0.1 to 3 mass-% based on the total mass of the flux.

[3]
The flux according to [1] or [2] comprising:
the activator in an amount of 0.1 to 30 mass-% based on the total mass of the flux,
wherein as the activator, the flux comprises at least one selected from an organic acid activator in an amount of 0 to 20 mass-%, an amine activator in an amount of 0 to 10 mass-%, or an amine hydrohalogenic acid salt activator and an organic halogen compound activator in a total amount of 0 to 20 mass-% based on the total mass of the flux.

[4]
The flux according to any one of [1] to [3], further comprising a solvent in an amount of 0 to 13 mass-%, a phosphoric ester in an amount of 0 to 10 mass-%, a silicone in an amount of 0 to 5 mass-%, and a surfactant in an amount of 0 to 5 mass-% based on the total mass of the flux.

[5]
A resin flux cored solder comprising the flux according to any one of [1], [3], and [4].

[6]
A flux coated solder coated with the flux according to any one of [2] to [4].

[7]
Use of the flux according to any one of [1] to [4] as a flux for a resin flux cored solder, or a flux for a flux coated solder.

Advantageous Effects of Invention

A resin flux cored solder or a flux coated solder comprising a flux of the present invention is able to suppress the scattering of flux and solder in use.

Further, a flux of the present invention is able to improve the processability of a resin flux cored solder or a flux coated solder.

BRIEF DESCRIPTION OF DRAWINGS

FIG. 1 is a schematic diagram showing a method of an evaluation test of the scattering.

DESCRIPTION OF EMBODIMENTS

Hereinbelow a flux of the present invention, and a resin flux cored solder and a flux coated solder comprising the flux will be described.

A flux of the present invention comprises at least one selected from an acrylic polymer and a vinyl ether polymer, as well as a rosin resin, and an activator.

The weight average molecular weight of at least one selected from an acrylic polymer and a vinyl ether polymer is from 8000 to 100000, and more preferably from 10000 to 55000 according to the present invention. When the weight average molecular weight of at least one selected from an acrylic polymer and a vinyl ether polymer is within the above range, a satisfactory scattering prevention effect may be exerted. As the weight average molecular weight of at least one selected from the acrylic polymer and the vinyl ether polymer according to the present invention, a value measured by a GPC method in terms of polystyrene may be used.

The at least one selected from the acrylic polymer and the vinyl ether polymer may have an SP value (solubility parameter) preferably in a range of 8.45 to 11.5, and more preferably 8.95 to 9.8. The SP value (solubility parameter) can be calculated from the molecular structure based on the Fedors method.

A flux of the present invention comprises at least one selected from an acrylic polymer and a vinyl ether polymer. The flux may include solely an acrylic polymer, solely a vinyl ether polymer, or both an acrylic polymer and a vinyl ether polymer. Also, a flux of the present invention may include another polymer such as an olefin polymer, in addition to the acrylic polymer, and the vinyl ether polymer.

The content of at least one selected from an acrylic polymer and a vinyl ether polymer based on the total mass of the flux is from 0.1 to 3 mass-%, preferably from 0.2 to 1.5 mass-%, and more preferably from 0.4 to 1.0 mass-%. When the content of at least one selected from an acrylic polymer and a vinyl ether polymer is within the above range, a satisfactory scattering prevention effect may be exerted.

Examples of a rosin resin include a raw material rosin, such as a gum rosin, a wood rosin, and a tall oil rosin, and derivatives obtained from the raw material rosin. Examples of the derivatives include a purified rosin, a hydrogenated rosin, a disproportionated rosin, a polymerized rosin, and an α,β-unsaturated carboxylic acid-modified product (acrylated rosin, maleated rosin, fumarated rosin, etc.), as well as a purified product, a hydrogenated product, and a disproportionated product of the polymerized rosin, and a purified product, a hydrogenated product, and a disproportionated product of the α,β-unsaturated carboxylic acid-modified product; and two or more thereof may be used. Further, in addition to the rosin resin, at least one resin selected from a terpene resin, a modified terpene resin, a terpene phenol resin, a modified terpene phenol resin, a styrene resin, a modified styrene resin, a xylene resin, and a modified xylene resin may be contained. As a modified terpene resin, an aromatic modified terpene resin, a hydrogenated terpene resin, a hydrogenated aromatic modified terpene resin, etc. may be used. As a modified terpene phenol resin, a hydrogenated terpene phenol resin, etc. may be used. As a modified styrene resin, a styrene acrylic resin, a styrene maleic acid resin, etc. may be used. As a modified xylene resin, a phenol-modified xylene resin, an alkylphenol-modified xylene resin, a phenol-modified resol type xylene resin, a polyol-modified xylene resin, a polyoxyethylene added xylene resin, etc. may be used. The total content of the above resins based on the total mass of the flux is preferably from 70 to 99.9 mass-%, and more preferably from 80 to 98 mass-%. The content of the rosin resins based on the total mass of the above resins is preferably ⅔ or more.

A flux of the present invention may further comprise an activator for improving the solderability. As the activator, an organic acid activator, an amine activator, an amine hydrohalogenic acid salt activator, an organic halogen compound activator, etc. may be used.

As the organic acid activator, adipic acid, azelaic acid, eicosanedioic acid, citric acid, glycolic acid, succinic acid, salicylic acid, diglycolic acid, dipicolinic acid, dibutylaniline diglycolic acid, suberic acid, sebacic acid, thioglycolic acid, terephthalic acid, dodecanedioic acid, p-hydroxyphenylacetic acid, picolinic acid, phenylsuccinic acid, phthalic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 2,3-dihydroxybenzoic acid, 2,4-diethyl glutaric acid, 2-quinolinecarboxylic acid, 3-hydroxybenzoic acid, malic acid, p-anisic acid, stearic acid, 12-hydroxystearic acid, oleic acid, linoleic acid, linolenic acid, dimer acid, hydrogenated dimer acid, trimer acid, and hydrogenated trimer acid, etc. may be used.

As an amine activator, an aliphatic amine, an aromatic amine, an amino alcohol, an imidazole, a benzotriazole, an amino acid, a guanidine, a hydrazide, etc. may be used. Examples of an aliphatic amine include dimethylamine, ethylamine, 1-aminopropane, isopropylamine, trimethylamine, allylamine, n-butylamine, diethylamine, sec-butylamine, tert-butylamine, N,N-dimethylethylamine, isobutylamine, and cyclohexylamine. Examples of an aromatic amine include aniline, N-methylaniline, diphenylamine, N-isopropylaniline, and p-isopropylaniline. Examples of an amino alcohol include 2-aminoethanol, 2-(ethylamino)ethanol, diethanolamine, diisopropanolamine, triethanolamine, N-butyl diethanolamine, triisopropanolamine, N,N-bis(2-hydroxyethyl)-N-cyclohexylamine, N,N,N',N'-tetrakis(2-hydroxypropyl)ethylenediamine, and N,N,N',N'',N''-pentakis(2-hydroxypropyl)diethylenetriamine. Examples of an imidazole include 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, and benzimidazole. Examples of a benzotriazole include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2,2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl] methylbenzotriazole, 2,2'-[[(methyl-1H-benzotriazol-1-yl)methyl]imino]bisethanol, an aqueous solution of sodium 1,2,3-benzotriazole, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, and 5-methylbenzotriazole. Examples of an amino acid include alanine, arginine, asparagine, aspartic acid, cysteine hydrochloride, glutamine, glutamic acid, glycine, histidine, isoleucine, leucine, lysine monohydrochloride, methionine, phenylalanine, proline, serine, threonine, tryptophan, tyrosine, valine, β-alanine, γ-aminobutyric acid, δ-aminovaleric acid, ε-aminohexanoic acid, ε-caprolactam, and 7-aminoheptanoic acid. Examples of a hydrazide include carbodihydrazide, malonic acid dihydrazide, succinic acid dihydrazide, adipic acid dihydrazide, 1,3-bis(hydrazinocarbonoethyl)-5-isopropylhydantoin, sebacic acid dihydrazide, dodecanedioic acid dihydrazide, 7,11-octadecadiene-1,18-dicarbohydrazide, and isophthalic acid dihydrazide. Examples of a guanidine include dicyandiamide, 1,3-diphenylguanidine, and 1,3-di-o-tolylguanidine.

As an amine hydrohalogenic acid salt activator, a hydrohalogenic acid salt (salt of HF, HCl, HBr or HI) of the amine compound listed above as an amine activator may be used. Examples of the amine hydrohalogenic acid salt include stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosin amine hydrobromide, 2-ethylhexylamine hydrochloride, isopropylamine hydrochloride, cyclohexylamine hydrochloride, 2-pipecoline hydrobromide, 1,3-diphenylguanidine hydrochloride, dimethylbenzylamine hydrochloride, hydrazine hydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, monoethylamine hydrobromide, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosin amine hydrobromide, 2-phenylimidazole hydrobromide, 4-benzylpyridine hydrobromide, L-glutamate hydrochloride, N-methylmorpholine hydrochloride, betaine hydrochloride, 2-pipecolin hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosin amine hydrofluoride, cyclohexylamine tetrafluoroborate, and dicyclohexylamine tetrafluoroborate.

As an organic halogen compound activator, trans-2,3-dibromo-2-butene-1,4-diol, 2,3-dibromo-1,4-butanediol, 2,3-dibromo-1-propanol, 2,3-dichloro-1-propanol, 1,1,2,2-tetrabromoethane, 2,2,2-tribromoethanol, pentabromoethane, carbon tetrabromide, 2,2-bis(bromomethyl)-1,3-propanediol, meso-2,3-dibromosuccinic acid, a chloroalkane, a chlorinated fatty acid ester, n-hexadecyltrimethylammonium bromide, triallyl isocyanurate hexabromide, 2,2-bis[3,5-dibromo-4-(2,3-dibromopropoxy)phenyl]propane, bis[3,5-dibromo-4-(2,3-dibromopropoxy)phenyl]sulfone, ethylenebispentabromobenzene, 2-chloromethyloxirane, HET acid, HET anhydride, and brominated bisphenol A epoxy resin, etc. may be used.

As for the content of each activator based on the total mass of the flux, it is preferably respectively from 0 to 20 mass-% for an organic acid activator, from 0 to 10 mass-% for an amine activator, and from 0 to 20 mass-% in total for an amine hydrohalogenic acid salt activator and an organic halogen compound activator. The content of the activator based on the total mass of the flux is preferably from 0.1 to 30 mass-%, and more preferably from 0.5 to 20 mass-%. When the content of the activator is 30 mass-% or less, troubles such as corrosion by a flux residue after soldering, and reduction in insulation resistance, do not occur.

A flux of the present invention may further comprise at least one selected from a solvent, a phosphoric ester, a silicone, and a surfactant.

As the solvent, various glycol ether solvents, etc. such as phenyl glycol, hexylene glycol, and hexyldiglycol, may be used. The content of the solvent based on the total mass of the flux is preferably from 0 to 13 mass-%, and more preferably from 0 to 5 mass-%. When the content of the solvent is 13 mass-% or less, a satisfactory scattering prevention effect may be exerted.

As the phosphoric ester, methyl acid phosphate, ethyl acid phosphate, isopropyl acid phosphate, monobutyl acid phosphate, butyl acid phosphate, dibutyl acid phosphate, butoxyethyl acid phosphate, 2-ethylhexyl acid phosphate, bis(2-ethylhexyl)phosphate, monoisodecyl acid phosphate, isodecyl acid phosphate, lauryl acid phosphate, isotridecyl acid phosphate, stearyl acid phosphate, oleyl acid phosphate, beef tallow phosphate, coconut oil phosphate, isostearyl acid phosphate, alkyl acid phosphate, tetracosyl acid phosphate, ethyleneglycol acid phosphate, 2-hydroxyethyl methacrylate acid phosphate, dibutyl pyrophosphate acid phosphate, mono-2-ethylhexyl (2-ethylhexyl)phosphonate, an alkyl alkylphosphonate, etc. may be used. The content of the phosphoric ester based on the total mass of the flux is preferably from 0 to 10 mass-%, and more preferably from 0 to 2 mass-%. When the content of the phosphoric ester is 10 mass-% or less, a satisfactory scattering prevention effect may be exerted.

As the silicone, a dimethyl silicone oil, a cyclic silicone oil, a methylphenyl silicone oil, a methyl hydrogen silicone oil, a higher fatty acid-modified silicone oil, an alkyl-modified silicone oil, an alkyl aralkyl-modified silicone oil, an amino-modified silicone oil, an epoxy-modified silicone oil, a polyether-modified silicone oil, an alkyl polyether-modified silicone oil, a carbinol-modified silicone oil, etc. may be used. The content of the silicone based on the total mass of the flux is preferably from 0 to 10 mass-%, and more preferably from 0 to 2 mass-%. When the content of the silicone is 10 mass-% or less, a satisfactory scattering prevention effect may be exerted.

As the surfactant, a polyoxyalkylene alkylamine, a polyoxyethylene alkylamine, a polyoxypropylene alkylamine, a polyoxyethylene polyoxypropylene alkylamine, a polyoxyalkylene alkylamide, a polyoxyethylene alkylamide, a polyoxypropylene alkylamide, a polyoxyethylene polyoxypropylene alkylamide, a polyoxyalkylene alkyl ether, a polyoxyethylene alkyl ether, a polyoxypropylene alkyl ether, a polyoxyethylene polyoxypropylene alkyl ether, a polyoxyalkylene alkyl ester, a polyoxyethylene alkyl ester, a polyoxypropylene alkyl ester, a polyoxyethylene polyoxypropylene alkyl ester, a polyoxyalkylene glyceryl ether, a polyoxyethylene glyceryl ether, a polyoxypropylene glyceryl ether, a polyoxyethylene polyoxypropylene glyceryl ether, a polyoxyalkylene diglyceryl ether, a polyoxyethylene diglyceryl ether, a polyoxypropylene diglyceryl ether, a polyoxyethylene polyoxypropylene diglyceryl ether, a polyoxyalkylene polyglyceryl ether, a polyoxyethylene polyglyceryl ether, a polyoxypropylene polyglyceryl ether, a polyoxyethylene polyoxypropylene polyglyceryl ether, a glycerin fatty acid ester, a diglycerin fatty acid ester, a polyglycerin fatty acid ester, a sorbitan fatty acid ester, a sucrose fatty acid ester, etc. may be used. The content of the surfactant based on the total mass of the flux is preferably from 0 to 5 mass-%. When the content of the surfactant is 5 mass-% or less, the effect of improving the detergency may be exerted without impairing the solderability.

From the viewpoint of the processability of a resin flux cored solder or a flux coated solder, a flux is preferably a solid or a high viscosity liquid (viscosity is 3500 Pa·s or more) at 25° C., and is more preferably a solid at 25° C. When the flux is a low viscosity liquid (viscosity is less than 3500 Pa·s) at 25° C., it is not preferable because the processability of a resin flux cored solder or a flux coated solder deteriorates.

According to the present invention, a flux is prepared by heating and mixing by a method common in the art a rosin resin, an activator and at least one selected from an acrylic polymer and a vinyl ether polymer, which has a weight average molecular weight of 8000 to 100000, in an amount of 0.1 to 3 mass-% based on the total mass of the flux. Then, a resin flux cored solder loaded with the flux may be produced by a manufacturing method common in the art. Alternatively, a flux coated solder may be produced by coating the outer surface of a solder alloy with the flux.

As for the composition of a solder alloy according to the present invention, any known composition of a solder alloy for a resin flux cored solder may be used. Specific examples thereof include a Sn—Ag alloy, a Sn—Cu alloy, a Sn—Ag—Cu alloy, a Sn—In alloy, a Sn—Pb alloy, a Sn—Bi alloy, and a Sn—Ag—Cu—Bi alloy, as well as an alloy prepared by blending additionally Ag, Cu, In, Ni, Co, Sb, Ge, P, Fe, Zn, Ga, or the like to the compositions of the above-listed alloys.

In a resin flux cored solder of the present invention, the mass ratio of a solder alloy to a flux (solder:flux) is preferably from 99.8:0.2 to 93.5:6.5, and more preferably from 98.5:1.5 to 95.5:4.5.

In a flux coated solder of the present invention, the mass ratio of a solder alloy to a flux (solder:flux) is preferably from 99.7:0.3 to 85:15, and more preferably from 99.4:0.6 to 97:3.

It is possible to join parts of an electronic device, or the like, by using the thus prepared resin flux cored solder or flux coated solder.

The present invention will be specifically described below by way of Examples, provided that the present invention be not limited to the contents described in the Examples.

EXAMPLES

The polymers to be blended in the fluxes in the following Examples 1 to 32, and Comparative Examples 1 to 21, as well as the weight average molecular weights and SP values of the polymers are summarized in the following Tables 1 and 2.

TABLE 1

| Sample name | Product name | Main component | Polymer Weight average molecular weight | SP value |
|---|---|---|---|---|
| Acrylic polymer (1) | POLYFLOW No. 75 | Acrylic polymer | 3000 | 9.95 |
| Acrylic polymer (2) | POLYFLOW No. 77 | | 3000 | 10.3 |
| Acrylic polymer (3) | POLYFLOW No. 56 | | 6000 | 10.7 |
| Acrylic polymer (4) | POLYFLOW No. 99C | | 8000 | 9.7 |
| Acrylic polymer (5) | FLOWLEN AC-265 | | 10000 | 8.95 |
| Acrylic polymer (6) | POLYFLOW No. 50E | | 11000 | 9.65 |
| Acrylic polymer (7) | POLYFLOW No. 36 | | 14000 | 9.55 |
| Acrylic polymer (8) | POLYFLOW WS-314 | | 17000 | 11.5 |
| Acrylic polymer (9) | POLYFLOW No. 90 | | 22000 | 9.65 |
| Acrylic polymer (10) | POLYFLOW No. 95 | | 22000 | 9.8 |
| Acrylic polymer (11) | POLYFLOW No. 7 | | 25000 | 9.15 |
| Acrylic polymer (12) | FLOWLEN AC-220F | | 50000 | 9.4 |
| Acrylic polymer (13) | POLYFLOW No. 85 | | 55000 | 9.5 |
| Acrylic polymer (14) | POLYFLOW No. 85HF | | 55000 | 9.5 |
| Acrylic polymer (15) | FLOWLEN AC-253 | | 100000 | 9 |
| Acrylic polymer (16) | FLOWLEN AC-202 | | 170000 | 8.9 |
| Acrylic polymer (17) | FLOWLEN AC-247 | | 220000 | 9 |
| Vinyl ether polymer (1) | FLOWLEN AC-326F | Vinyl ether polymer | 25000 | 8.55 |
| Vinyl ether polymer (2) | FLOWLEN AC-903HF | | 150000 | 9.25 |
| Olefin polymer (1) | FLOWLEN AC-2300C | Olefin polymer | 3500 | 8.45 |
| Olefin polymer (2) | FLOWLEN AC-2200HF | | 5000 | 8.4 |
| Butadiene polymer (1) | FLOWLEN AC-1190 | Butadiene polymer | 12000 | 8.8 |
| Butadiene polymer (2) | FLOWLEN AC-1190HF | | 12000 | 8.8 |
| Butadiene polymer (3) | FLOWLEN AC-2000 | | 12000 | 8.9 |
| Butadiene polymer (4) | FLOWLEN AC-2000HF | | 12000 | 8.9 |
| (Butadiene polymer + Olefin polymer) (1) | FLOWLEN AC-1160 | Mixture of butadiene polymer and olefin polymer | 10000 | 8.5 |
| Butadiene polymer (Blended with silicone) (1) | FLOWLEN AC-1170 | Butadiene polymer (Silicone blend) | 10000 | 8.5 |
| Butadiene polymer (Blended with silicone) (2) | FLOWLEN AC-1170HF | | 10000 | 8.5 |
| (Butadiene polymer + Olefin polymer) (2) | FLOWLEN AC-1160HF | Mixture of butadiene polymer and olefin polymer | 10000 | 8.5 |

* All of the above products are manufactured by Kyoeisha Chemical Co., Ltd.

TABLE 2

| Sample name | Product name | Main component | Polymer Weight average molecular weight | SP value |
|---|---|---|---|---|
| (Acrylic polymer + Vinyl ether polymer) (1) | FLOWLEN AC-303 | Mixture of acrylic polymer and vinyl ether polymer | 15000 | 8.95 |
| (Acrylic polymer + Vinyl ether polymer) (2) | FLOWLEN AC-303HF | | 15000 | 8.95 |
| (Acrylic polymer + Vinyl ether polymer) (3) | FLOWLEN AC-324 | | 15000 | 9.15 |
| (Acrylic polymer + Vinyl ether polymer + Olefin polymer) (1) | FLOWLEN AC-2230EF | Mixture of acrylic polymer, vinyl ether polymer, and olefin polymer | 22000 | 8.45 |
| (Acrylic polymer + Vinyl ether polymer) (4) | FLOWLEN AC-300 | Mixture of acrylic polymer and vinyl ether polymer | 65000 | 8.75 |
| (Acrylic polymer + Vinyl ether polymer) (5) | FLOWLEN AC-300HF | | 65000 | 8.75 |
| (Acrylic polymer + Vinyl ether polymer) (6) | FLOWLEN AC-300VF | | 65000 | 8.8 |

TABLE 2-continued

| Sample name | Product name | Main component | Weight average molecular weight | SP value |
|---|---|---|---|---|
| (Acrylic polymer + Fluorine-modified silicone + Silica) (1) | FLOWLEN AC-950 | Mixture of acrylic polymer, fluorine-modified silicone, and silica | 380000 | 9.05 |
| (Acrylic polymer + Fluorine-modified silicone + Silica) (2) | FLOWLEN AC-970MS | | 380000 | 9.05 |

* All of the above products are manufactured by Kyoeisha Chemical Co., Ltd.

Evaluation (1) Evaluation of the scattering of flux and solder, and (2) evaluation of the processability of solder were carried out as follows on each resin flux cored solder of Examples 1 to 32, and Comparative Examples 1 to 21.

(1) Evaluation of the Scattering of Flux and Solder

As shown in FIG. 1, a soldering iron was placed at the center of a circle with a radius of 100 mm on a scattered droplet collection paper sheet. At the innermost of the circle on the scattered droplet collection paper sheet, there is a hole with a radius of 5 mm, so that solder melted at the tip of the soldering iron falls down through the hole. In a cycle, a resin flux cored solder (diameter 0.8 mm) is fed (feed rate: 20 mm/sec) to the tip of the soldering iron (set temperature: 380° C.) until 10 mm of the resin flux cored solder has been fed, then the feed is paused for 1 sec. The cycle was repeated totally 50 cycles. Then, the number of flux and solder balls having scattered over the scattered droplet collection paper sheet after 50 cycles was counted.

The scattering of flux and solder was rated according to the following criteria.

Good (⊚): The number of flux and solder balls having scattered over the scattered droplet collection paper sheet was 5 or less.

Fair (○): The number of flux and solder balls having scattered over the scattered droplet collection paper sheet was 10 or less.

Poor (×): The number of flux and solder balls having scattered over the scattered droplet collection paper sheet was beyond 10.

(2) Evaluation of the Processability of Solder

The state of a flux for a resin flux cored solder was observed at 25° C. to determine whether it was solid or liquid. When the flux was liquid, the flux viscosity was measured by sandwiching the flux between plates of a rheometer (Thermo Scientific HAAKE MARS III (Trademark)), and then rotating the plates at 6 Hz.

The processability of a solder was rated according to the following criteria.

Good (⊚): The flux is solid when stored at 25° C.

Fair (○): The flux is liquid when stored at 25° C., but the viscosity measured with a rheometer is not less than 3500 Pa·s.

Poor (×): The flux is liquid when stored at 25° C., and the viscosity measured with a rheometer is less than 3500 Pa·s.

Examples 1 to 9, and Comparative Examples 1 to 3

Fluxes for resin flux cored solders of Examples 1 to 9 and Comparative Examples 1 to 3 were prepared with the compositions set forth in the following Table 3. A resin flux cored solder (diameter 0.8 mm) was produced using each flux for resin flux cored solders of Examples 1 to 9 and Comparative Examples 1 to 3 and a solder alloy. The composition of the used solder alloy was Sn-3Ag-0.5Cu (each numerical value is mass-%). The resin flux cored solder was produced such that the mass ratio of the solder alloy to the flux became 97:3. The numerical values for the respective components in the following Tables 3 to 9 represent a mass-% of each component based on the total mass of the flux, and specifically the numerical value in the row of "Polymer" represents the mass-% of the solid content based on the total mass of the flux in each polymer product. Further, as the rosin in the following Tables 3 to 9, a mixed rosin (rosin ester 75 wt-%, and hydrogenated rosin 25 wt-%) was used.

Then, (1) evaluation of the scattering of flux and solder, and (2) evaluation of the processability of solder were carried out as follows on each resin flux cored solder of Examples 1 to 9 and Comparative Examples 1 to 3. The evaluation results are shown in the following Table 3.

TABLE 3

| | | | Example | | | | | Comparative Example | | |
|---|---|---|---|---|---|---|---|---|---|---|
| | | | 1 | 2 | 3 | 4 | 5 | 1 | 2 | 3 |
| | Rosin | | 95.4 | 95.3 | 95 | 94.5 | 92.5 | 95.5 | 95.45 | 90.5 |
| Activator | Adipic acid | | 1 | 1 | 1 | 1 | 1 | 1 | 1 | 1 |
| | N,N-diethylaniline• HBr salt | | 0.5 | 0.5 | 0.5 | 0.5 | 0.5 | 0.5 | 0.5 | 0.5 |

TABLE 3-continued

|  |  | | | | | | | | |
|---|---|---|---|---|---|---|---|---|---|
| Polymer | Triallyl isocyanurate hexabromide | 3 | 3 | 3 | 3 | 3 | 3 | 3 | 3 |
|  | Acrylic polymer (10) | 0.1 | 0.2 | 0.5 | 1 | 3 |  | 0.05 | 5 |
|  | Total | 100 | 100 | 100 | 100 | 100 | 100 | 100 | 100 |
| Evaluation result | Prevention of scattering | ○ | ⊙ | ⊙ | ⊙ | ○ | × | × | × |
|  | Processability | ⊙ | ⊙ | ⊙ | ⊙ | ⊙ | ⊙ | ⊙ | ⊙ |

|  |  | Example | | | |
|---|---|---|---|---|---|
|  |  | 6 | 7 | 8 | 9 |
| Activator | Rosin | 95.4 | 94.5 | 92.5 | 95 |
|  | Adipic acid | 1 | 1 | 1 | 1 |
|  | N,N-diethylaniline•HBr | 0.5 | 0.5 | 0.5 | 0.5 |
|  | Triallyl isocyanurate hexabromide | 3 | 3 | 3 | 3 |
| Polymer | Acrylic polymer (10) |  |  |  | 0.25 |
|  | Vinyl ether polymer (1) | 0.1 | 1 | 3 | 0.25 |
|  | Total | 100 | 100 | 100 | 100 |
| Evaluation result | Prevention of scattering | ○ | ⊙ | ○ | ⊙ |
|  | Processability | ⊙ | ⊙ | ⊙ | ⊙ |

As obvious from the results in Table 3 above, in Examples 1 to 9, where an acrylic polymer (10) and/or a vinyl ether polymer (1), which have a weight average molecular weight of 8000 to 100000, was used in an amount of 0.1 to 3 mass-% based on the total mass of the flux, both of the evaluation results with respect to the scattering of flux and solder and the processability of solder were fair or good. Since the scattering of flux and solder hardly occurs on the substrate in the case of the resin flux cored solders of Examples 1 to 9 at the time of heating by a soldering iron, sticking of flux or solder to a nearby electronic component was found to be suppressed in mounting. Meanwhile, in the case of the fluxes for resin flux cored solders of Examples 1 to 9, since they were solid at 25° C., the processability of the resin flux cored solder was good.

On the other hand, in the case of Comparative Example 1 where an acrylic polymer and a vinyl ether polymer, which have a weight average molecular weight of 8000 to 100000, are not contained, Comparative Example 2 where the content of an acrylic polymer having a weight average molecular weight of 8000 to 100000 is less than 0.1 mass-% based on the total mass of the flux, and Comparative Example 3 where the content of an acrylic polymer having a weight average molecular weight of 8000 to 100000 is more than 3 mass-% based on the total mass of the flux, although the processability of a solder was good, the scattering of flux and solder was severe.

Examples 10 to 20, and Comparative Examples 4 to 9

Fluxes for resin flux cored solders of Examples 10 to 20, and Comparative Examples 4 to 9 were prepared in the same manner as in Examples 1 to 9, and Comparative Examples 1 to 3, except that the compositions set forth in the following Tables 4 and 5 were used instead of the compositions set forth in Table 3 above.

Then, (1) evaluation of the scattering of flux and solder, and (2) evaluation of the processability of solder were carried out as above on each resin flux cored solder of Examples 10 to 20 and Comparative Examples 4 to 9. The evaluation results are shown in the following Tables 4 and 5.

TABLE 4

|  |  | Example | | | | | | | | | | |
|---|---|---|---|---|---|---|---|---|---|---|---|---|
|  |  | 10 | 11 | 12 | 13 | 14 | 15 | 16 | 17 | 18 | 19 | 20 |
| Activator | Rosin | 95 | 95 | 95 | 95 | 95 | 95 | 95 | 95 | 95 | 95 | 95 |
|  | Adipic acid | 1 | 1 | 1 | 1 | 1 | 1 | 1 | 1 | 1 | 1 | 1 |
|  | N,N-diethylaniline•HBr salt | 0.5 | 0.5 | 0.5 | 0.5 | 0.5 | 0.5 | 0.5 | 0.5 | 0.5 | 0.5 | 0.5 |
|  | Triallyl isocyanurate hexabromide | 3 | 3 | 3 | 3 | 3 | 3 | 3 | 3 | 3 | 3 | 3 |
| Polymer | Acrylic Polymer (4) | 0.5 |  |  |  |  |  |  |  |  |  |  |
|  | Acrylic Polymer (5) |  | 0.5 |  |  |  |  |  |  |  |  |  |
|  | Acrylic Polymer (6) |  |  | 0.5 |  |  |  |  |  |  |  |  |
|  | Acrylic Polymer (7) |  |  |  | 0.5 |  |  |  |  |  |  |  |
|  | Acrylic Polymer (8) |  |  |  |  | 0.5 |  |  |  |  |  |  |
|  | Acrylic Polymer (9) |  |  |  |  |  | 0.5 |  |  |  |  |  |
|  | Acrylic Polymer (11) |  |  |  |  |  |  | 0.5 |  |  |  |  |
|  | Acrylic Polymer (12) |  |  |  |  |  |  |  | 0.5 |  |  |  |

TABLE 4-continued

|  |  | Example | | | | | | | | | | |
|---|---|---|---|---|---|---|---|---|---|---|---|---|
|  |  | 10 | 11 | 12 | 13 | 14 | 15 | 16 | 17 | 18 | 19 | 20 |
|  | Acrylic Polymer (13) |  |  |  |  |  |  |  | 0.5 |  |  |  |
|  | Acrylic Polymer (14) |  |  |  |  |  |  |  |  |  | 0.5 |  |
|  | Acrylic Polymer (15) |  |  |  |  |  |  |  |  |  |  | 0.5 |
|  | Total | 100 | 100 | 100 | 100 | 100 | 100 | 100 | 100 | 100 | 100 | 100 |
| Evaluation result | Prevention of scattering | ⊙⊙ | ⊙⊙ | ⊙⊙ | ⊙⊙ | ⊙⊙ | ⊙⊙ | ⊙⊙ | ⊙⊙ | ⊙⊙ | ⊙⊙ | ○ |
|  | Processability | ⊙⊙ | ⊙⊙ | ⊙⊙ | ⊙⊙ | ⊙⊙ | ⊙⊙ | ⊙⊙ | ⊙⊙ | ⊙⊙ | ⊙⊙ | ⊙⊙ |

TABLE 5

|  |  | Comparative Example | | | | | |
|---|---|---|---|---|---|---|---|
|  |  | 4 | 5 | 6 | 7 | 8 | 9 |
| Activator | Rosin | 95 | 95 | 95 | 95 | 95 | 95 |
|  | Adipic acid | 1 | 1 | 1 | 1 | 1 | 1 |
|  | N,N-diethylaniline•HBr salt | 0.5 | 0.5 | 0.5 | 0.5 | 0.5 | 0.5 |
|  | Triallyl isocyanurate hexabromide | 3 | 3 | 3 | 3 | 3 | 3 |
| Polymer | Acrylic polymer (1) | 0.5 |  |  |  |  |  |
|  | Acrylic polymer (2) |  | 0.5 |  |  |  |  |
|  | Acrylic polymer (3) |  |  | 0.5 |  |  |  |
|  | Acrylic polymer (16) |  |  |  | 0.5 |  |  |
|  | Acrylic polymer (17) |  |  |  |  | 0.5 |  |
|  | Vinyl ether polymer (2) |  |  |  |  |  | 0.5 |
|  | Total | 100 | 100 | 100 | 100 | 100 | 100 |
| Evaluation result | Prevention of scattering | × | × | × | × | × | × |
|  | Processability | ⊙⊙ | ⊙⊙ | ⊙⊙ | ⊙⊙ | ⊙⊙ | ⊙⊙ |

As obvious from the results in Tables 4 and 5 above, in Examples 10 to 20, where acrylic polymers (4) to (9), or (11) to (15) having a weight average molecular weight of 8000 to 100000 were used in an amount of 0.5 mass-% based on the total mass of the flux, both of the evaluation results with respect to the scattering of flux and solder and the processability of solder were fair or good. Since the scattering of flux and solder hardly occurs on the substrate in the case of the resin flux cored solders of Examples 10 to 20 at the time of heating by a soldering iron, sticking of flux or solder to a nearby electronic component was found to be suppressed in mounting. Meanwhile, in the case of fluxes for resin flux cored solders of Examples 10 to 20, since they were solid at 25° C., the processability of the resin flux cored solder was good.

On the other hand, in the case of Comparative Examples 4 to 6 where an acrylic polymer (1), (2) or (3) having a weight average molecular weight of less than 8000 was used, Comparative Examples 7 and 8 where an acrylic polymer (16) or (17) having a weight average molecular weight exceeding 100000 was used, and Comparative Example 9 where a vinyl ether polymer (2) having a weight average molecular weight exceeding 100000 was used, although the processability of a solder was good, the scattering of flux and solder was severe.

Examples 21 to 32, and Comparative Examples 10 to 21

Fluxes for resin flux cored solders of Examples 21 to 32, and Comparative Examples 10 to 21 were prepared in the same manner as in Examples 1 to 9, and Comparative Examples 1 to 3, except that the compositions set forth in the following Tables 6 to 9 were used instead of the compositions set forth in Table 3 above.

Then, (1) evaluation of the scattering of flux and solder, and (2) evaluation of the processability of solder were carried out as above on each resin flux cored solder of Examples 21 to 32 and Comparative Examples 10 to 21. The evaluation results are shown in the following Tables 6 to 9.

TABLE 6

|  |  | Example | | | | | | |
|---|---|---|---|---|---|---|---|---|
|  |  | 21 | 22 | 23 | 24 | 25 | 26 | 27 |
| Activator | Rosin | 95 | 95 | 95 | 95 | 95 | 95 | 95 |
|  | Adipic acid | 1 | 1 | 1 | 1 | 1 | 1 | 1 |
|  | N,N-diethyleniline•HBr salt | 0.5 | 0.5 | 0.5 | 0.5 | 0.5 | 0.5 | 0.5 |
|  | Triallyl isocyanurate hexabromide | 3 | 3 | 3 | 3 | 3 | 3 | 3 |
| Polymer | (Acrylic polymer + Vinyl ether Polymer) (1) | 0.5 |  |  |  |  |  |  |
|  | (Acrylic polymer + Vinyl ether Polymer) (2) |  | 0.5 |  |  |  |  |  |
|  | (Acrylic polymer + Vinyl ether Polymer) (3) |  |  | 0.5 |  |  |  |  |
|  | (Acrylic polymer + Vinyl ether Polymer + Olefin polymer) (1) |  |  |  | 0.5 |  |  |  |
|  | (Acrylic polymer + Vinyl ether Polymer) (4) |  |  |  |  | 0.5 |  |  |

TABLE 6-continued

|  |  | Example | | | | | | |
| --- | --- | --- | --- | --- | --- | --- | --- | --- |
|  |  | 21 | 22 | 23 | 24 | 25 | 26 | 27 |
|  | (Acrylic Polymer + Vinyl ether Polymer) (5) |  |  |  |  |  | 0.5 |  |
|  | (Acrylic polymer + Vinyl ether Polymer) (6) |  |  |  |  |  |  | 0.5 |
|  | Total | 100 | 100 | 100 | 100 | 100 | 100 | 100 |
| Evaluation result | Prevention of scattering | ○○ | ○○ | ○○ | ○○ | ○○ | ○○ | ○○ |
|  | Processability | ○○ | ○○ | ○○ | ○○ | ○○ | ○○ | ○○ |

TABLE 7

|  |  | Example | | | | |
| --- | --- | --- | --- | --- | --- | --- |
|  |  | 28 | 29 | 30 | 31 | 32 |
| Activator | Rosin | 90 | 85 | 90 | 82 | 90 |
|  | Adipic acid | 1 | 1 | 1 | 1 | 1 |
|  | N,N-diethylaniline•HBr salt | 0.5 | 0.5 | 05 | 0.5 | 0.5 |
|  | Triallyl isocyanurate hexabromide | 3 | 3 | 3 | 3 | 3 |
| Solvent | Hexyldiglycol |  |  | 5 | 13 |  |
|  | Silicone | 5 |  |  |  |  |
| Phosphoric ester | Isodecyl acid phosphate |  | 10 |  |  |  |
| Surfactant | Polyoxyalkylene polyalkylamide |  |  |  |  | 5 |
| Polymer | Acrylic polymer (10) | 0.5 | 0.5 | 0.5 | 0.5 | 0.5 |
|  | Total | 100 | 100 | 100 | 100 | 100 |
| Evaluation result | Prevention of scattering | ○○ | ○○ | ○○ | ○ | ○ |
|  | Processability | ○○ | ○ | ○ | ○ | ○○ |

TABLE 8

|  |  | Comparative Example | | | | | |
| --- | --- | --- | --- | --- | --- | --- | --- |
|  |  | 10 | 11 | 12 | 13 | 14 | 15 |
| Activator | Rosin | 95 | 95 | 95 | 95 | 95 | 95 |
|  | Adipic acid | 1 | 1 | 1 | 1 | 1 | 1 |
|  | N,N-diethylaniline•HBr salt | 0.5 | 0.5 | 0.5 | 0.5 | 0.5 | 0.5 |
|  | Triallyl isocyanurate hexabromide | 3 | 3 | 3 | 3 | 3 | 3 |
| Polymer | Olefin polymer (1) | 0.5 |  |  |  |  |  |
|  | Olefin polymer (2) |  | 0.5 |  |  |  |  |
|  | Butadiene polymer (1) |  |  | 0.5 |  |  |  |
|  | Butadiene polymer (2) |  |  |  | 0.5 |  |  |
|  | Butadiene polymer (3) |  |  |  |  | 0.5 |  |
|  | Butadiene polymer (4) |  |  |  |  |  | 0.5 |
|  | Total | 100 | 100 | 100 | 100 | 100 | 100 |
| Evaluation result | Prevention of scattering | × | × | × | × | × | × |
|  | Processability | ○○ | ○○ | ○○ | ○○ | ○○ | ○○ |

TABLE 9

|  |  | Comparative Example | | | | | |
| --- | --- | --- | --- | --- | --- | --- | --- |
|  |  | 16 | 17 | 18 | 19 | 20 | 21 |
| Activator | Rosin | 95 | 95 | 95 | 95 | 95 | 95 |
|  | Adipic acid | 1 | 1 | 1 | 1 | 1 | 1 |
|  | N,N-diethylaniline•HBr salt | 0.5 | 0.5 | 0.5 | 0.5 | 0.5 | 0.5 |
|  | Triallyl isocyanurate hexabromide | 3 | 3 | 3 | 3 | 3 | 3 |
| Polymer | (Butadiene polymer + Olefin polymer) (1) | 0.5 |  |  |  |  |  |
|  | Butadiene polymer (Blended with silicon) (1) |  | 0.5 |  |  |  |  |
|  | Butadiene polymer (Blended with silicone) (2) |  |  | 0.5 |  |  |  |
|  | Butadiene polymer + Olefin polymer) (2) |  |  |  | 0.5 |  |  |
|  | (Acrylic polymer + Fluorine-modified silicone + Silica) (1) |  |  |  |  | 0.5 |  |
|  | (Acrylic polymer + Fluorine-modified silicone + Silica) (2) |  |  |  |  |  | 0.5 |
|  | Total | 100 | 100 | 100 | 100 | 100 | 100 |
| Evaluation result | Prevention of scattering | × | × | × | × | × | × |
|  | Processability | ○○ | ○○ | ○○ | ○○ | ○○ | ○○ |

As obvious from the results in Tables 6 to 9 above, in Examples 21 to 23, and 25 to 27, where a mixture of an acrylic polymer and a vinyl ether polymer, which have a weight average molecular weight of 8000 to 100000, was used in an amount of 0.5 mass-% based on the total mass of the flux; in Example 24, where a mixture of an acrylic polymer, a vinyl ether polymer, and an olefin polymer, which have a weight average molecular weight of 8000 to 100000, was used in an amount of 0.5 mass-% based on the total mass of the flux; and in Examples 28 to 32, where an acrylic polymer having a weight average molecular weight of 8000 to 100000 was used in an amount of 0.5 mass-% based on the total mass of the flux, and to which a silicone, a phosphoric ester, a solvent, or a surfactant was further added; both of the evaluation results with respect to the scattering of flux and solder, and the processability of solder were fair or good. Since the scattering of flux and solder hardly occurs on the substrate in the case of the resin flux cored solders of Examples 21 to 32 at the time of heating by a soldering iron, sticking of flux or solder to a nearby electronic component was found to be suppressed in mounting. Meanwhile, in the case of fluxes for resin flux cored solders of Examples 21 to 32, since they were in a high viscosity liquid or solid state at 25° C., the processability of the resin flux cored solder was fair or good.

On the other hand, in the case of Comparative Examples 10 to 19 where an acrylic polymer and a vinyl ether polymer, which have a weight average molecular weight of 8000 to 100000, were not used, but another polymer was used, and in the case of Comparative Examples 20 and 21 where an acrylic polymer having a weight average molecular weight exceeding 100000 was used, although the processability of a solder was good, the scattering of flux and solder was severe.

The invention claimed is:

1. A flux for a resin flux cored solder or a flux coated solder comprising:
    a rosin resin in an amount of 70 to 99.9 mass-% based on the total mass of the flux,
    an activator,
    at least one selected from an acrylic polymer and a vinyl ether polymer, which has a weight average molecular weight of 8000 to 100000, in an amount of 0.1 to 3 mass-% based on the total mass of the flux, and
    a solvent in an amount of 0 to 13 mass-% based on the total mass of the flux.

2. The flux according to claim 1 comprising:
    the activator in an amount of 0.1 to 30 mass-% based on the total mass of the flux,
    wherein as the activator, the flux comprises at least one selected from an organic acid activator in an amount of 0 to 20 mass-%, an amine activator in an amount of 0 to 10 mass-%, or an amine hydrohalogenic acid salt activator and an organic halogen compound activator in a total amount of 0 to 20 mass-%, based on the total mass of the flux.

3. The flux according to claim 1, further comprising a phosphoric ester in an amount of 0 to 10 mass-%, a silicone in an amount of 0 to 5 mass-%, and a surfactant in an amount of 0 to 5 mass-%, based on the total mass of the flux.

4. A resin flux cored solder comprising a flux,
    wherein the flux comprises:
    a rosin resin in an amount of 70 to 99.9 mass-% based on the total mass of the flux,
    an activator,
    at least one selected from an acrylic polymer and a vinyl ether polymer, which has a weight average molecular weight of 8000 to 100000, in an amount of 0.1 to 3 mass-% based on the total mass of the flux, and
    a solvent in an amount of 0 to 13 mass-% based on the total mass of the flux.

5. A flux coated solder coated with a flux,
    wherein the flux comprises:
    a rosin resin in an amount of 70 to 99.9 mass-% based on the total mass of the flux,
    an activator,
    at least one selected from an acrylic polymer and a vinyl ether polymer, which has a weight average molecular weight of 8000 to 100000, in an amount of 0.1 to 3 mass-% based on the total mass of the flux, and
    a solvent in an amount of 0 to 13 mass-% based on the total mass of the flux.

* * * * *